з,579,610
Patented May 18, 1971

3,579,610
PROTECTIVE AND DECORATIVE THERMO-SETTING COATING
John Christos Petropoulos, Norwalk, and Ralph Earl Layman, Stamford, Conn., assignors to American Cyanamid Company, Stamford, Conn.
No Drawing. Filed Oct. 2, 1968, Ser. No. 764,595
Int. Cl. C08g 37/32; C08f 37/18, 29/22
U.S. Cl. 260—853      10 Claims

ABSTRACT OF THE DISCLOSURE

A coating composition comprising an acrylic resin, polyvinylidene fluoride and hexakismethoxymethyl melamine is disclosed.

BACKGROUND OF THE INVENTION

The use of an acrylic homopolymer or copolymer resin with polyvinylidene fluoride, a melamine or urea formaldehyde resin and a pigment to produce coating compositions such as paints and enamels is well known to those skilled in the art. For example, British Pat. 1,049,088 teaches such a composition wherein the acrylic polymer is present in amounts ranging from about 1% to 25% by weight of the total polymer. Similarly, U.S. Pat. No. 3,340,222 discloses coating compositions composed of an acrylic polymer, polyvinylidene fluoride and various pigments.

While both of the systems produced by the above-mentioned patents are generally effective in producing relatively good coatings, the systems are deficient from a commercial standpoint in that they are relatively expensive and, in the case of the British patent, require the use of a catalyst to promote the cross-linking necessary to produce effective coatings. Most of the prior art compositions also possess low chemical resistance.

SUMMARY

We have now discovered a novel composition which is at least as efficient in regard to the ultimate properties of coatings produced therefrom as those disclosed in the prior art. However, our novel compositions are more economically formulated and, in some ways, are better in regard to the properties of those of the prior art, i.e. they are more resistant to chemical attack.

We achieve our superior results by the use of a specific melamine composition, namely hexakismethyloxymethyl melamine. The use of this composition produces greatly superior results than conventional alkylated urea-formaldehyde or conventional butylated formaldehyde resin systems.

Additionally, we have discovered that by the use of a specific acrylic polymer system, we are able to utilize greater amounts of these systems than heretofore believed possible with correspondingly less amounts of polyvinylidene fluoride, a very expensive resinous material. We thus produce coating compositions at a much lower cost than otherwise would be the case, said compositions producing coatings with properties such as hardness, impact strength, gloss and solvent resistance, equal to or better than prior art systems.

An additional feature of the instant compositions is that no catalyst need be added to promote the cross-linking of the hexakismethoxymethyl melamine even though it has previously been believed that the presence of a strong mineral acid was necessary to promote the reaction of such a melamine with functional groups. By omitting a catalyst, we can obtain coatings of higher gloss, greater storage stability and greater uniformity of curing.

DESCRIPTION OF THE INVENTION INCLUDING PREFERRED EMBODIMENTS

As mentioned above, the first component of our novel coating compositions is an acrylic resin. The acrylic resin must be produced as a copolymer of ethyl or methyl methacrylate, or mixtures thereof with from about 2% to 15%, by weight, based on the weight of the methacrylate, of acrylic acid, methacrylic acid, a hydroxyalkyl acrylate or methacrylate wherein the alkyl group contains from 2–4 carbon atoms, inclusive, or mixtures of these materials. When mixtures are utilized, the weight of the combined reactants must be within the above range.

A third component which is preferable but not essential as a part of the acrylic resin component of the novel compositions claimed herein is ethyl acrylate. This monomer may be present in the acrylic resin in amounts ranging from about 0% to 35%, the total amount of monomers present in the acrylic resin, of course, being 100%. These acrylic resins may be proudced by known techniques such as by the solution or emulsion polymerization thereof in the presence of a peroxide catalyst at temperatures ranging from about 50–200° C. Such known methods are disclosed, for example, in U.S. Pat. No. 3,252,950 which reference is hereby incorporated herein.

The second essential component which is utilized in our novel coating compositions is polyvinylidene fluoride. This polymer is also well known to those skilled in the art and can be prepared by any known method such as that disclosed in U.S. Pat. 2,435,537. This component is utilized in the ultimate composition in amounts ranging from about 30% to about 65%, by weight, based on the total amount of the acrylic resin and the polyvinylidene fluoride.

The third essential component of our novel coating compositions is hexakismethoxymethyl melamine. Polymethyl ethers of polymethylol melamines, and the processes for preparing them, are well known in the art, see specifically U.S. Pats. 2,918,452, 2,998,410 and 2,998,411.

The hexakismethoxymethyl melamine constituent of the novel compositions claimed and disclosed herein is however, very difficult to prepare in a pure state. In the known processes for preparing this highly etherified, highly methylolated melamine, the analysis of the final product tends to indicate that the average methylolation is less than hexamethylol melamine. Likewise, the average degree of methylation appears to be less than the hexamethyl ether. Nevertheless, these products are deemed to contain a preponderance of the hexakismethoxymethyl melamine compound and lesser amounts of such materials as the tetramethyl ether of tetramethylol melamine, the tetramethyl ether of pentamethylol melamine, the tetramethyl ether of hexamethylol melamine, the pentamethyl ether of pentamethylol melamine and the pentamethyl ether of hexamethylol melamine. It is to be understood, therefore, that wherever hexakismethoxymethyl melamine is referred to herein, those compositions which contain melamine derivatives that are, on an average, not fully methylolated or fully methylated, but which approach such full methylolation and etherification, are encompassed and are substantially equivalent to pure hexakismethoxymethyl melamine. Hexakismethoxymethyl melamine is a monomeric material but is potentially a resin-forming material and can interreact with itself and other monomeric materials, such as those containing a terminal hydroxy group. The hexakismethoxymethyl melamine is utilized in the instant compositions in amounts ranging from about 1% to about 10%, by weight, based on the total weight of the acrylic polymer utilized.

The compositions may be prepared by charging the polyvinylidene fluoride into a suitable mixing vessel such as a ball mill or pebble mill along with the acrylic resin in solution in a latent solvent in such an amount so as to form a composition having preferably not more than 80% resin solids. Suitable latent solvents include those which are disclosed in the above-mentioned British and U.S. 3,340,222 patents and which are basically known to be true solvents for the acrylic resin at room temperature but true solvents for the polyvinylidene fluoride only at an elevated temperature. Suitable solvents include the ketones such as methyl isobutyl ketone, methyl ethyl ketone; alkyl and alkoxy esters of aliphatic and aromatic acids such as dimethyl adipate, diethyl succinate, 2-methoxyether acetate; glycol ethers and esters such as diethylene glycol monoethyl ether acetate etc. cyclic ethers such as dioxane and tetrahydrofuran; ethylene carbonate; lactones such as butyrolactone; nitroalkanes such as 1-nitro-propane and mixtures thereof. Additional materials such as toluene etc. may be added to promote a suitable consistency in the resultant mixture.

The compositions of the instant invention are useful as coatings for a great many substrates including wood, metal, ceramics, plastics and the like.

Other materials may be added to the resultant composition such as pigments, dyes, UV absorbers, photochromic materials, gloss reducing agents such as talc, anti-mottling agents, without departing from the scope of the present invention.

The following examples are set forth for purposes of illustration only and are not to be construed as limitations on the present invention except as set forth in the appended claims. All parts and percentages are by weight unless otherwise specified.

Acrylic Resin A

Into a 3 neck reaction vessel are charged:

| | Parts |
|---|---|
| (1) Toluene | 500 |
| (2) Methyl isobutyl ketone | 550 |
| (3) Ditertiary butyl peroxide | 2 |
| (4) Dodecyl mercaptan | 1.5 |
| (5) Methyl methacrylate | 428 |
| (6) Methacrylic acid | 22 |

The air is displaced by nitrogen flushing, and thereafter a slight flow of nitrogen is used to exclude air during the polymerization. The contents are heated to refluxing and held at reflux for 24 hours. After cooling, the content of polymer is found to be 30% and the solution viscosity is 40 poises.

Acrylic Resin B

Into a 3 neck reaction vessel equipped with $N_2$ inlet, thermometer, agitator and reflux condenser are charged:

| | Parts |
|---|---|
| (1) Toluene | 325 |
| (2) Methyl isobutyl ketone | 360 |
| (3) β-Hydroxypropyl methacrylate | 23 |
| (4) Methyl methacrylate | 290 |
| (5) Ditertiary butyl peroxide | 1 |
| (6) Dodecyl mercaptan | 1 |

After processing in a manner similar to Resin A, the polymer content is found to be 32.6%.

Acrylic Resin C

In a fashion similar to that for Resin A, the following are processed for 12 hours:

| | Parts |
|---|---|
| (1) Toluene | 880 |
| (2) Butanol | 50 |
| (3) Ditertiary butyl peroxide | 4.5 |
| (4) Dodecyl mercaptan | 1 |
| (5) Methyl methacrylate | 415 |
| (6) Ethyl acrylate | 50 |
| (7) Methacrylic acid | 15 |
| (8) β-Hydroxypropyl methacrylate | 20 |

After cooling, the polymer content is found to be 35%, and the viscosity $Z_3$ on the Gardner-Holdt Scale.

Acrylic Resin D

| | Parts |
|---|---|
| (1) Toluene | 930 |
| (2) Methyl methacrylate | 415 |
| (3) Ethyl acrylate | 50 |
| (4) β-Hydroxypropyl methacrylate | 35 |
| (5) Dodecyl mercaptan | 1 |
| (6) Ditertiary butyl peroxide | 4.5 |

Processing of this resin is similar to that for Resin C. After 12 hours the viscosity is Z and the polymer content is 34.5%.

Acrylic Resin E

| | Parts |
|---|---|
| (1) Ethyl methacrylate | 440 |
| (2) β-Hydroxypropyl methacrylate | 60 |
| (3) Toluene | 640 |
| (4) Butanol | 55 |
| (5) Methyl isobutyl ketone | 55 |
| (6) Dodecyl mercaptan | 1 |
| (7) 2,5-dimethyl-2,5-di(t-butylperoxy)hexane | 5 |

This resin is also processed similarly to Resin C and after 12 hours has a viscosity of W and a polymer content of 40%.

Acrylic Resin F

| | Parts |
|---|---|
| (1) Methyl methacrylate | 300 |
| (2) Ethyl acrylate | 125 |
| (3) β-Hydroxypropyl methacrylate | 75 |
| (4) Dodecyl mercaptan | 1 |
| (5) 2,5-dimethyl-2,5-di(t-butylperoxy)hexane | 5 |
| (6) Toluene | 630 |
| (7) Methyl isobutyl ketone | 200 |
| (8) n-Butanol | 100 |

This resin is processed in a fashion similar to that for Resin C, and after 12 hours has a viscosity of T and a polymer content of 36%.

Acrylic Resin G (Comparative)

| | Parts |
|---|---|
| (1) Toluene | 500 |
| (2) Methyl isobutyl ketone | 550 |
| (3) Dodecyl mercaptan | 1.5 |
| (4) 2,5-dimethyl-2,5-di(t-butylperoxy)hexane | 1.5 |
| (5) Methyl methacrylate | 450 |

The above is processed similarly to Resin A and after 24 hours refluxing the viscosity is $Z_3$ and the polymer content 30.3% by weight.

EXAMPLE 1

The following is an example of an enamel wherein the acrylic resin solids to polyvinylidene fluoride, hereinafter sometimes called PVDF, ratio is 60:40.

| | Parts |
|---|---|
| PVDF | 100 |
| Acrylic resin Solution No. A | 442 |
| Dimethyl phthalate | 100 |
| Butyrolactone | 50 |
| Titanium dioxide | 125 |
| Hexakismethoxymethyl melamine | 7.5 |

These weights of material are charged to a pebble mill which is rolled 24 hours. A film of .003″ wet thickness drawn down on chromate treated 0.025″ thick aluminum is air dried two minutes and then baked one minute at 300° C. The color is a good white and the 60° gloss value is 50. Reverse impact resistance is 50 inch pounds, pencil hardness H, and the resistance to rubbing with a methyl ethyl ketone wet towel is >200 double strokes.

When the hexakismethoxymethyl melamine is omitted from Example 1 or replaced by an equal solids weight of butylated melamine formaldehyde or butylated urea-formaldehyde resin, the methyl ethyl ketone rub resistance is only 15–20. It is surprising that the enamel containing hexakismethoxymethyl melamine is so much more solvent resistant than the enamel with butylated resin because the latter does not require catalyst for curing whereas hexakismethoxymethyl melamine heretofore has required a strong mineral acid catalyst to promote crosslinking or curing.

EXAMPLE 2

The following enamel has an acrylic to PVDF ratio of 60:40, and contains 2% hexakismethoxymethyl melamine based on the acrylic resin solids weight.

| | Parts |
|---|---|
| Acrylic resin solution No. A | 177 |
| PVDF powder | 40 |
| Diethyl phthalate | 45 |
| Butyrolactone | 50 |
| Titanium dioxide (pigment) | 50 |
| Phthalocyanine blue (dye) | 1.5 |
| Talc (a gloss reducing agent) | 10 |
| Hexakismethoxymethyl melamine | 1.2 |
| Anti-silking agent (an anti-mottling agent) | 1.0 |

All materials are charged to a pebble mill which is then rolled approximately 60 hours. The finished enamel is applied to anodized aluminum, air dried 3 minutes and baked one minute at 305° C. This enamel has a 20° gloss rating of 2, a pencil hardness of H and withstands 80 double rubs with methyl ethyl ketone. After reverse impacting with 40 inch pounds, the enamel cannot be scratched off by the bump by one's finger nail or pulled off by tape.

In a fashion similar to that used for preparing the enamel of Example 1, acrylic resins B–G are also converted into enamels containing PVDF, pigment, latent solvent and hexakismethoxymethyl melamine. Acrylic Resin G is a homopolymer of methyl methacrylate. In each instance, the ratio of acrylic resin solids to PVDF is 56:44 and the amount of hexakismethoxymethyl melamine is 5% of the acrylic resin solids. Each enamel is catalyzed by addition of a solvent solution of toluene sulfonic acid, producing 2% acid, based on the weight of hexakismethoxymethyl melamine. Although the catalyst is not essential, it is hereby illustrated that the use of catalyst is feasible and permits slightly lower baking temperatures. Lesser percentages (½–1%) may be satisfactorily used. Each enamel is thinned with toluene to a viscosity of 100 seconds, Ford Cup No. 4, and then applied as a .003" wet film to chromate treated aluminum. After air drying about one minute, they are baked one minute at 285° C. Table I shows the properties of these enamels indicating that they are useful for coating metal, and that enamels according to our invention are superior to enamels made with a homopolymer of methyl methacrylate.

TABLE I.—PROPERTIES OF ENAMELS MADE FROM ACRYLIC RESINS A–G
[(PVDF: acrylic ratio 44:56)]

| Acrylic resin | 60° gloss | Pencil hardness | Methyl ethyl ketone rub resistance | Reverse [1] impact resistance | Reverse [2] impact to destroy adhesion | Percent hexakismethoxymethyl melamine |
|---|---|---|---|---|---|---|
| A | 64 | 3H | >200 | 20 | 40 | 5 |
| B | 60 | 2H | >200 | 30 | 60 | 5 |
| C | 63 | 2H | >200 | 30 | 50 | 5 |
| D | 53 | 2H | >200 | 40 | 60 | 5 |
| E | 60 | F | >200 | 40 | 60 | 5 |
| E-1 | 60 | F | >200 | 20 | 50 | 12 |
| F | 65 | 2H | >200 | 30 | 50 | 5 |
| G | 80 | 3H | 50–60 | <10 | 10–15 | 0 |

[1] No cracks when viewed through microscope.
[2] Impact values in units of inch pounds.

NOTE.—Percent hexakismethoxymethyl melamine based on acrylic resin content.

EXAMPLES 2 AND 3

When acrylic acid is substituted for the methacrylic acid of Acrylic Resin A and the β-hydroxypropyl methacrylate of Acrylic Resin E is replaced by β-hydroxypropyl acrylate and these acrylic resins are then blended with PVDF and hexakismethoxymethyl melamine as in Example 1, similar results are obtained.

EXAMPLES 4–9

Another set of enamels is made from Acrylic Resin B by first preparing in a pebble mill the following composition, wherein the acrylic resin to PVDF ratio is 40:60.

Pebble mill dispersion

| | Parts |
|---|---|
| PVDF powder | 120 |
| Titanium dioxide pigment | 100 |
| Dimethyl phthalate | 120 |
| Butyrolactone | 75 |
| Acrylic resin solution B | 245 |

After 48 hours of grinding, the dispersion is removed from the mill and divided into six equal portions. To the first four there are added amounts of hexakismethoxymethyl melamine equal to 1, 2, 4 and 8% respectively of the acrylic resin solids. To the fifth is added 8% of butylated melamine formaldehyde resin, while no amino compound or resin is added to the sixth portion. All six enamels are coated onto chromate treated, 0.025" thick aluminum and baked 2 minutes at 300° C. When cool, all coatings withstand 70 inch pounds impact from the back, have F pencil hardness and essentially equal gloss. However, the enamels containing the hexakismethoxymethyl melamine are strongly resistant to >300 methyl ethyl ketone double rubs, whereas the other two enamels fail after 50–60 of such rubs.

EXAMPLE 10

The procedure of Example 1 is again followed except that Acrylic Resin B is utilized and the β-hydroxypropyl methacrylate thereof is replaced by an equivalent amount of β-hydroxyethyl methacrylate. Results similar to those shown in Table I for Acrylic Resins A–F are obtained.

EXAMPLE 11

When the β-hydroxypropyl methacrylate of Acrylic Resin C is replaced by an equivalent amount of β-hydroxyethyl methacrylate and the resultant resin processed according to Example 2, results similar to those set forth in Table I for Acrylic Resins A–F are obtained.

EXAMPLE 12

Results similar to those set forth in Table I for Acrylic Resins A–F are also obtained when the β-hydroxypropyl methacrylate of Acrylic Resin D is replaced by an equivalent amount of 4-hydroxybutyl methacrylate.

EXAMPLE 13

When Acrylic Resin E is modified by replacing the β-hydroxypropyl methacrylate with an equivalent amount of β-hydroxyethyl acrylate, results similar to those set forth in Table I for Acrylic Resins A–F are observed.

EXAMPLE 14

Example 11 is followed except that the β-hydroxypropyl methacrylate of Acrylic Resin C is replaced by an equivalent amount of β-hydroxyethyl acrylate. Similar results are recorded.

EXAMPLE 15

When the 75 parts of β-hydroxypropyl methacrylate are reduced to 40 parts, an additional 35 parts of 4-hydroxybutyl acrylate are added to Acrylic Resin F and the resultant resin is processed according to Example 2, results similar to those set out in Table I for Resins A–F are achieved.

We claim:
1. A coating composition consisting essentially of (A) from about 35% to about 70%, by weight, of an acrylic resin consisting essentially of a copolymer of methyl methacrylate, ethyl methacrylate or mixtures thereof with from about 2 to about 15%, by weight, based on the weight of methacrylate, of acrylic acid, methacrylic acid, a hydroxyalkyl acrylate or methacrylate wherein the alkyl group contains 2–4 carbon atoms, inclusive, or mixtures thereof and about 0 to about 35%, by weight, based on the total weight of (A) of ethyl acrylate, (B) correspondingly, from about 30% to about 65%, by weight of polyvinylidene fluoride and (C) from about 1% to about 10%, by weight, based on the weight of (A) of hexakismethoxymethyl melamine.

2. A composition according to claim 1 wherein a latent solvent for said (A) and (B) is present.

3. A composition according to claim 1 wherein said (A) is a copolymer of methyl methacrylate and methacrylic acid.

4. A composition according to claim 1 wherein said (A) is a copolymer of ethyl methacrylate and β-hydroxypropyl methacrylate.

5. A composition according to claim 1 wherein said (A) is a copolymer of methyl methacrylate, β-hydroxypropyl methacrylate and ethyl acrylate.

6. A composition according to claim 3 wherein a latent solvent for said (A) and (B) is present.

7. A composition according to claim 4 wherein a latent solvent for said (A) and (B) is present.

8. A composition according to claim 5 wherein a latent solvent for said (A) and (B) is present.

9. A composition according to claim 1 wherein said (A) is a copolymer of ethyl methacrylate, acrylic acid and ethyl acrylate.

10. A composition according to claim 1 wherein said (A) is a copolymer of methyl methacrylate and β-hydroxypropyl acrylate.

References Cited

UNITED STATES PATENTS

| | | | |
|---|---|---|---|
| 3,107,227 | 10/1963 | Suen et al. | 260—853 |
| 3,211,806 | 10/1965 | Petropoulous et al. | 260—853 |
| 3,324,069 | 6/1967 | Koblitz et al. | 260—900 |
| 3,449,466 | 6/1969 | Gerek et al. | 260—853 |
| 3,454,518 | 7/1969 | Kelly | 260—900 |

FOREIGN PATENTS

| | | | |
|---|---|---|---|
| 1,049,088 | 11/1966 | Great Britain | 260—853 |

JOHN C. BLEUTGE, Primary Examiner

U.S. Cl. X.R.

117—123, 132, 138.8, 148, 161; 260—30.4, 31.8, 32.8, 33.4, 33.6, 39, 41, 856, 900, 901